(12) United States Patent
Eom

(10) Patent No.: US 8,377,582 B2
(45) Date of Patent: Feb. 19, 2013

(54) COOLING APPARATUS OF A BATTERY MODULE

(75) Inventor: Kiyeol Eom, Suwon-si (KR)

(73) Assignees: Samsung SDI Co., Ltd., Yongin-Si, Gyeonggi-do (KR); Robert Bosch GmbH, Stuttgart (DE)

( * ) Notice: Subject to any disclaimer, the term of this patent is extended or adjusted under 35 U.S.C. 154(b) by 115 days.

(21) Appl. No.: 12/805,526

(22) Filed: Aug. 4, 2010

(65) Prior Publication Data

US 2011/0189523 A1     Aug. 4, 2011

(30) Foreign Application Priority Data

Feb. 4, 2010   (KR) ........................ 10-2010-0010259

(51) Int. Cl.
| | | |
|---|---|---|
| *H01M 10/50* | (2006.01) | |
| *H01M 2/12* | (2006.01) | |
| *H01M 2/26* | (2006.01) | |
| *H01M 2/28* | (2006.01) | |
| *H01M 6/00* | (2006.01) | |
| *H01M 10/00* | (2006.01) | |
| *H01M 2/16* | (2006.01) | |
| *H01M 2/18* | (2006.01) | |
| *H01M 2/00* | (2006.01) | |

(52) U.S. Cl. .......... 429/120; 429/71; 429/121; 429/122; 429/143; 429/148

(58) Field of Classification Search .................... 429/71, 429/120, 121, 122, 143, 148
See application file for complete search history.

(56) References Cited

U.S. PATENT DOCUMENTS

| | | | | |
|---|---|---|---|---|
| 2004/0086780 | A1* | 5/2004 | Ebermann | 429/120 |
| 2005/0089750 | A1* | 4/2005 | Ng et al. | 429/120 |
| 2009/0195210 | A1* | 8/2009 | Takeuchi et al. | 320/134 |

FOREIGN PATENT DOCUMENTS

| | | | |
|---|---|---|---|
| JP | 56142844 A | * | 11/1981 |
| JP | 10-189061 A | | 7/1998 |
| JP | 2004-111370 A | | 8/2004 |
| JP | 2009-301877 A | | 12/2009 |

OTHER PUBLICATIONS

The Engineering ToolBox Thermal Expansion Metals Printed Jun. 29, 2012 {http://www.engineeringtoolbox.com/thermal-expansion-metals-d_859.html}.*
Korean Notice of Allowance to KR 10-2010-0010259, dated Nov. 21, 2011(EOM).
Korean Office Action in KR 10-2010-0010259, dated Aug. 19, 2011 (EOM).

* cited by examiner

*Primary Examiner* — Patrick Ryan
*Assistant Examiner* — Aaron Greso
(74) *Attorney, Agent, or Firm* — Lee & Morse, P.C.

(57) ABSTRACT

Disclosed is a cooling apparatus of a battery module, which can minimize temperature deviation between a plurality of secondary batteries constituting the battery module. The cooling apparatus of a battery module includes a housing including an accommodation part accommodating the battery module, and an air passage through which outside air passes, a first heat transfer member fixed to the housing and having a surface exposed to the air passage, and a second heat transfer member disposed between the battery module and the first heat transfer member. The second heat transfer member may contact a portion in the battery module having relatively high temperature.

19 Claims, 7 Drawing Sheets

COOLING APPARATUS OF A BATTERY MODULE

BACKGROUND

1. Field

Embodiments relate to a cooling apparatus of a battery module.

2. Description of the Related Art

In general, a battery module is formed by connecting a plurality of lithium ion secondary batteries in series. At this case, unlike primary batteries that is not rechargeable, the secondary batteries are rechargeable batteries that are widely used in electronic appliances such as cellular phones, personal digital assistants (PDAs), and notebook computers.

Specifically, such a lithium ion secondary battery has an operation voltage of about 3.6 V, which is three times greater than that of a nickel-cadmium battery or nickel-hydrogen battery that is widely used as a power source of electronic equipment. In addition, since lithium ion secondary batteries have a high energy density per unit weight, applications thereof are rapidly increasing. Thus, high power secondary batteries using non-aqueous electrolyte having a high energy density are being recently developed.

A plurality of high power secondary batteries are connected in series to form a battery module to be used in an apparatus requiring a large power, for example, a vehicle. Such battery modules emit a large amount of heat, and thus, require effective temperature management for preventing degradation.

SUMMARY

Embodiments are therefore directed to cooling apparatus of a battery module, which substantially overcomes one or more of the problems due to the limitations and disadvantages of the related art.

It is therefore a feature of an embodiment to provide a cooling apparatus of a battery module, which can minimize temperature deviation between a plurality of secondary batteries constituting the battery module.

It is yet another feature of an embodiment to provide a cooling apparatus of a battery module, which can cool the battery module with minimized temperature deviation.

At least one of the above and other features and advantages may be realized by providing a cooling apparatus of a battery module including a housing including an accommodation part accommodating the battery module, and an air passage through which outside air passes, a first heat transfer member fixed to the housing and having a surface exposed to the air passage, and a second heat transfer member disposed between the battery module and the first heat transfer member.

The second heat transfer member may contact a center portion of the battery module.

The second heat transfer member may have a larger thermal expansion coefficient than that of the first heat transfer member.

The first heat transfer member may be formed of aluminum, and the second heat transfer member may be formed of any one of zinc, magnesium, and SUS (stainless steels prescribed in the Japanese Industrial Standard).

The second heat transfer member may be formed by combining at least two materials having different thermal expansion coefficients.

The at least two materials may include: a first material disposed at a center portion of the battery module and having a first thermal expansion coefficient; and a second material disposed at left and right edge portions of the battery module with respect to the center portion of the battery module and having a second thermal expansion coefficient less than the first thermal expansion coefficient.

The first heat transfer member may be formed of aluminum, the first material of the second heat transfer member may be any one of zinc and magnesium, and the second material of the second heat transfer member may be SUS (one of stainless steels prescribed in the Japanese Industrial Standard).

The second heat transfer member may include: a first part disposed at a center portion of the battery module; and a second part disposed at left and right edge portions of the battery module with respect to the center portion of the battery module, wherein the first part has a thickness larger than that of the second part.

The first part may be formed of a material that is identical to that of the second part. The first and second parts may be integrally formed.

The first heat transfer member may include a heat sink, and the heat sink may include: a cooling plate fixed to the housing and contacting the second heat transfer member; and a plurality of cooling fins protruding from the cooling plate to the air passage.

The cooling apparatus may further include: a blowing fan configured to blow air to the air passage; a sensing part configured to sense temperature of a center portion of the battery module; and a control unit controlling the blowing fan according to the temperature sensed by the sensing part.

The sensing part may be a temperature sensor, the battery module may include a plurality of secondary batteries, the plurality of secondary batteries may include a first secondary battery disposed at the center portion of the battery module, and the temperature sensor may be provided to the first secondary battery.

The control unit may include: a calculation part calculating a signal sensed by the sensing part; and a comparison part comparing a value calculated by the calculation part with a pre-stored criterion value; and an output part applying a corresponding speed value to the blowing fan, according to a signal of the comparison part.

The output part may accelerate the blowing fan as a difference between the calculated value and the criterion value increases.

The control unit may be a control unit provided with micro processes of a battery management system that is electrically connected to the battery module to manage the battery module.

When the second heat transfer member has a larger thermal expansion coefficient than that of the first heat transfer member, the criterion value may be a temperature value measured at a time point when an edge portion of the second heat transfer member is completely spaced apart from the edge portion of the battery module.

The second heat transfer member may be formed by combining at least two materials having different thermal expansion coefficients. When the two materials includes a first material disposed at a center portion of the battery module and having a first thermal expansion coefficient, and a second material disposed at left and right edge portions of the battery module with respect to the center portion of the battery module and having a second thermal expansion coefficient less than the first thermal expansion coefficient, the criterion value may be a temperature value measured at a time point when the second material is completely spaced apart from the edge portion of the battery module.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
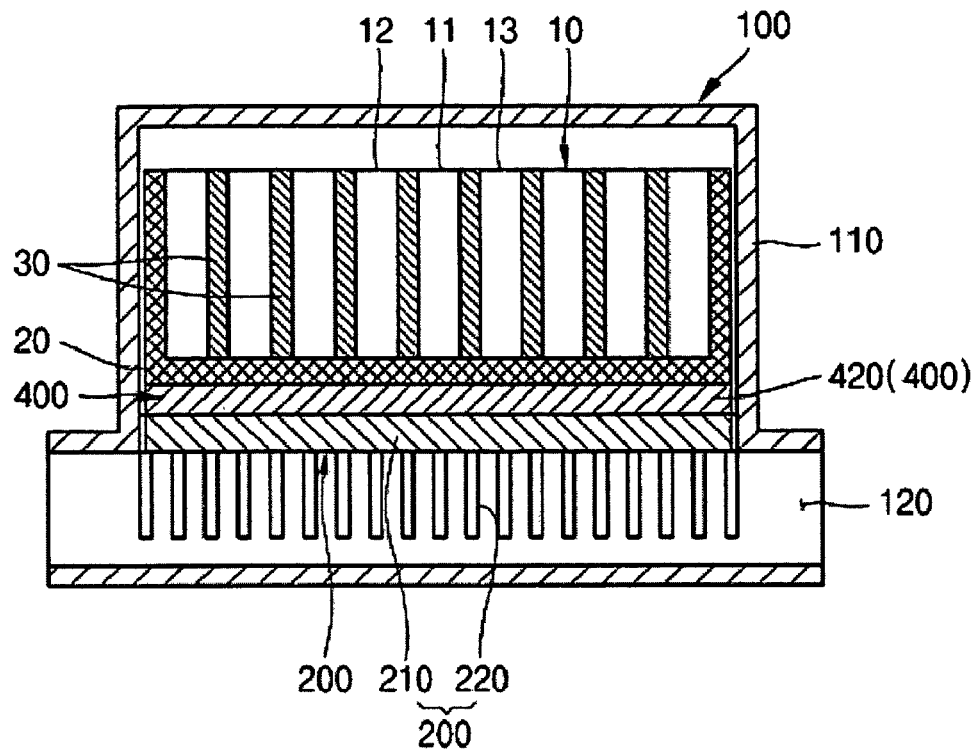
FIG. 1 illustrates a vertical cross-sectional view of a cooling apparatus of a battery module according to an embodiment of the present invention.

Korean Patent Application No. 10-2010-0010259, filed on Feb. 4, 2010, in the Korean Intellectual Property Office, and entitled: "Cooling Apparatus of Battery Module," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
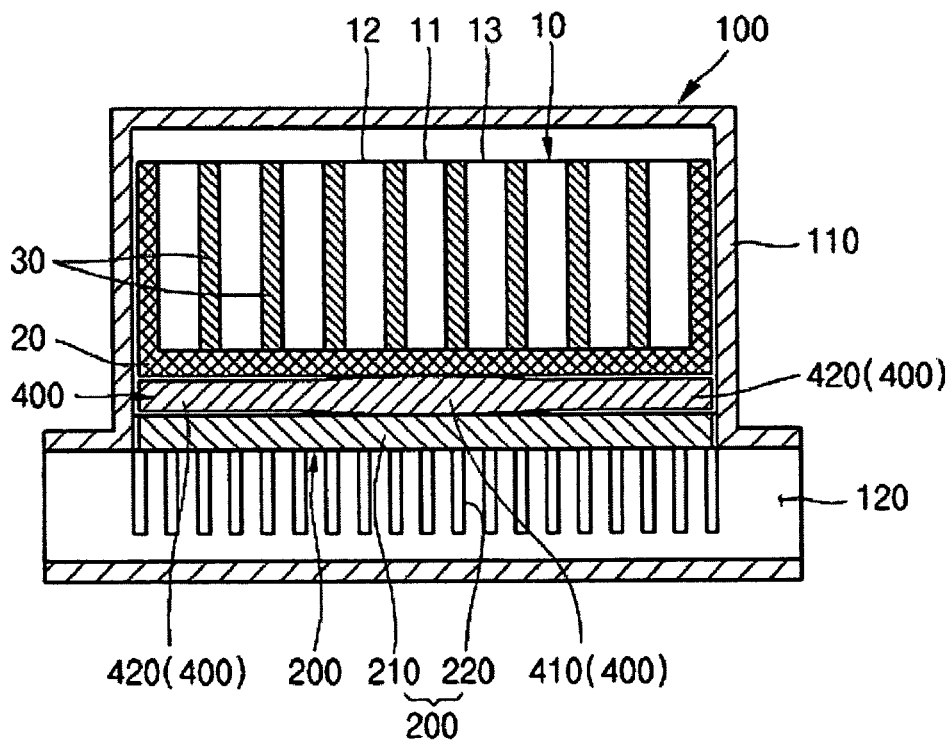
FIG. 2 illustrates a vertical cross-sectional view of a state where only a center portion of a second heat transfer member contacts a center portion of the battery module after the center portion of the second heat transfer member is thermally expanded more than the edge portion thereof in the state of FIG. 1.

FIG. 1 illustrates a vertical cross-sectional view of a cooling apparatus of a battery module according to an embodiment of the present invention. FIG. 2 illustrates a vertical cross-sectional view of a state where only a center portion of a second heat transfer member contacts a center portion of the battery module after the center portion of the second heat transfer member thermally expands more than the edge portion thereof in the state of FIG. 1.

Referring to FIG. 1, the cooling apparatus according to an embodiment includes a housing 100, a first heat transfer member 200, and a second heat transfer member 400.

The housing 100 may include an accommodation part 110 accommodating a battery module 10, and an air passage 120 through which outside air passes. The housing 100 supports the battery module 10 and guides outside air to the battery module 10.

The battery module 10 may include a plurality of lithium ion secondary batteries (hereinafter, referred to as 'secondary batteries'). The secondary batteries may be connected to each other in series. Furthermore, the battery module 10 may include a case 20 supporting the secondary batteries and barriers 30 disposed between the respective secondary batteries to absorb heat from the secondary batteries and transfer the heat to the case 20. The case 20 may be formed of aluminum.

The first heat transfer member 200 may be fixed to the housing 100 and may have a surface exposed to the air passage 120 to dissipate heat to the air passage 120. In detail, the first heat transfer member 200 may be a heat sink (hereinafter, denoted by reference numeral 200, together with the first heat transfer member). The heat sink 200 may include a cooling plate 210 provided to the second heat transfer member 400 to be described later and a plurality of cooling fins 220 protruding from the cooling plate 210 to the air passage 120. Thus, heat can be effectively emitted from the cooling plate 210 through the cooling fins 220.

The second heat transfer member 400 is disposed between the battery module 10 and the first heat transfer member 200 to contact a portion having relatively high temperature in the battery module 10. Specifically, according to a test, when the second heat transfer member 400 has a thermal expansion coefficient equal to or less than that of the first heat transfer member 200, even when the temperature of the battery module 10 varied, the thermal expansion amount of the second heat transfer member 400 did vary substantially. That is, in the case where the second heat transfer member 400 had a thermal expansion coefficient equal to or less than that of the first heat transfer member 200, even when the temperature of the battery module 10 was varied, most of the second heat transfer member 400 maintained contact with the battery module 10. In contrast, when the second heat transfer member 400 has a thermal expansion coefficient larger than that of the first heat transfer member 200, the second heat transfer member 400 was in contact with a portion having relatively high temperature in the battery module 10. Thus, for the second heat transfer member 400 to be in contact with a portion having relatively high temperature in the battery module 10, the second heat transfer member 400 may have a thermal expansion coefficient larger than that of the first heat transfer member 200.

Furthermore, since the secondary batteries are horizontally disposed in parallel in the battery module 10, the temperatures of first, second, and third secondary batteries 11, 12, and 13 disposed at a relatively center portion, i.e., the temperature of the center portion of the battery module 10 is higher than that of the edge portion of the battery module 10. Ultimately, this temperature deviation may accelerate the degradation of the center portion of the battery module 10 to reduce the whole service life of the battery module 10 or degrade the whole performance of the battery module 10.

Thus, as described above, when the second heat transfer member 400 has a larger thermal expansion coefficient than that of the first heat transfer member 200, when the temperature of the battery module 10 increases, only the center portion of the case 20 of the battery module 10 contacts the cooling plate 210 through a center portion 410 of the second heat transfer member 400, as illustrated in FIG. 2. That is, the center portion of the case 20 contacts the center portion 410 of the second heat transfer member 400 and, simultaneously, the center portion 410 of the second heat transfer member 400 contacts the cooling plate 210. Thus, heat is preferentially transferred from the center portion of the battery module 10 to the cooling plate 210 through the center portion 410 of the second heat transfer member 400. That is, respective temperatures of the secondary batteries constituting the battery module 10 may be more uniformly maintained to minimize the temperature deviation. Ultimately, since limitations due to the temperature deviation are reduced, the service life and performance of the battery module 10 can be improved.

For example, when the first heat transfer member 200 is formed of aluminum, the second heat transfer member 400 may be formed of any one of zinc, magnesium, and SUS (stainless steels prescribed in the Japanese Industrial Standard, and STS are stainless steels prescribed in the Korean Industrial Standard), which have a larger thermal expansion coefficient than aluminum. Thus, the second heat transfer member 400 may only contact a portion of the battery module having the highest temperature, e.g., a center portion of the battery module 10, when the temperature of the battery module 10 is varied.

Figure 3:
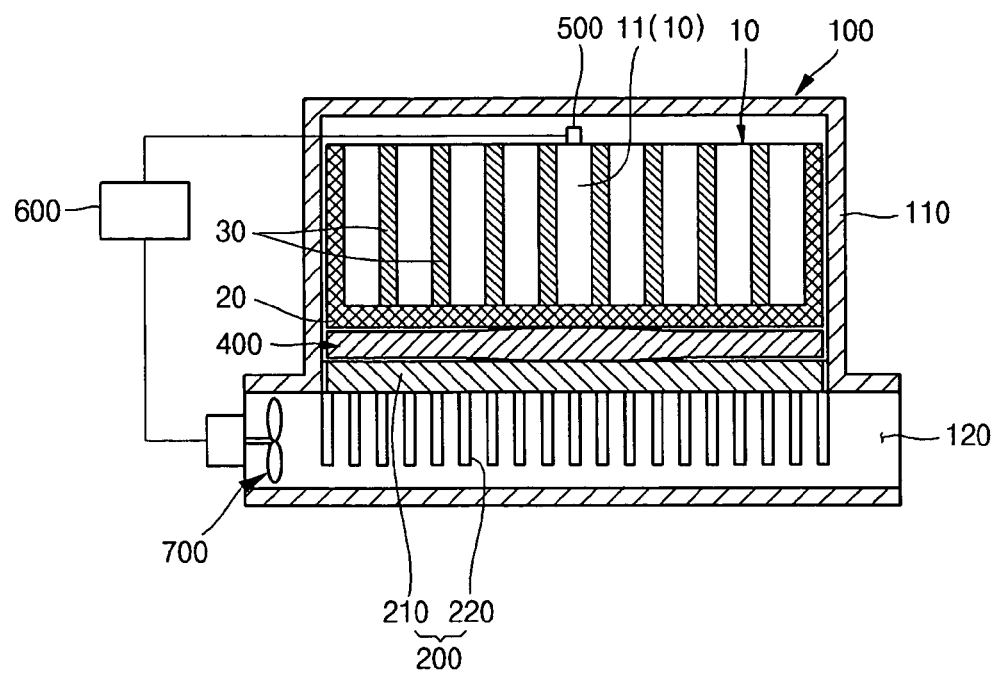
FIG. 3 illustrates a vertical cross-sectional view of the cooling apparatus of FIG. 1, which further includes a blowing fan, a temperature sensor, and a control unit.
Figure 4:
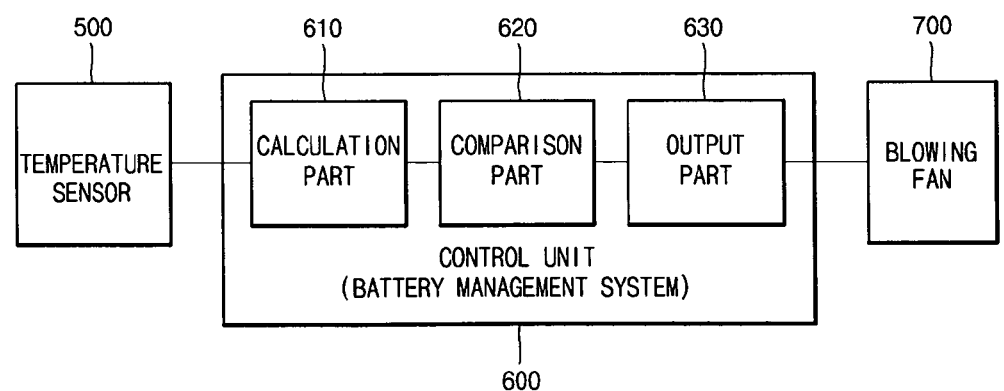
FIG. 4 illustrates a block diagram of the blowing fan, the temperature sensor, and the control unit in the cooling apparatus of FIG. 3.

Referring to FIGS. 3 and 4, the cooling apparatus according to the current embodiment may further include a blowing fan 700, a sensing part 500, and a control unit 600. FIG. 3 illustrates a vertical cross-sectional view of the cooling apparatus according to the current embodiment, which further includes the blowing fan 700, a temperature sensor (hereinafter, also denoted by reference numeral 500, together with the sensing part), and the control unit 600. FIG. 4 illustrates a block diagram of the blowing fan 700, the temperature sensor 500, and the control unit 600.

The blowing fan 700 is disposed at the air passage 120 of the housing 100 and blows air toward the air passage 120 such that the cooling fins 220 rapidly exchange hear with outside air.

The sensing part 500 senses the temperature of the center portion of the battery module 10. For example, the sensing part 500 may be the temperature sensor 500. Specifically, the temperature sensor 500 may be disposed at the first secondary battery 11 of the secondary batteries to measure the maximum temperature value of the battery module 10.

The control unit 600 controls the blowing fan 300 according to a temperature sensed by the temperature sensor 500, as illustrated in FIG. 4. In detail, the control unit 600 may include a calculation part 610 calculating a signal sensed by the temperature sensor 500, a comparison part 620 comparing an actual temperature value calculated by the calculation part 610 with a pre-stored criterion value, and an output part 630 applying a corresponding speed value to the blowing fan 700 according to a signal from the comparison part 620. Specifically, the output part 630 may accelerate speed of the blowing fan 700 through its logic as the difference between an actual temperature value and the criterion value increases. In other words, when a difference value corresponding to the difference between an actual temperature value and the criterion value is compared with various reference values stored in the output part 630, and the difference value is disposed within a reference value range of any one of the various reference values, the blowing fan 700 may be accelerated to a predetermined speed matching with the reference value. The predetermined speed may be predetermined through a test according to the reference value and increases as the reference value increases. As such, when the blowing fan 700 is accelerated, heat can be more effectively emitted from the battery module 10.

The control unit 600 may be provided independently or may be a control unit provided in micro-processors of a battery management system (BMS) installed on a battery pack. Specifically, when the control unit 600 is included in micro-processors of a battery management system rather than a stand alone unit, costs may be reduced. Such a BMS (not shown) is a management system electrically connected to the battery module 10 to measure the current, voltage, and temperature of a battery when being charged and discharged, and inform a user of remaining capacity and service life of the battery or sense a dangerous situation, e.g., a fire or explosion, and warn the user about the situation. The BMS typically includes a micro-processor (not shown) for managing a battery, and a circuit board (not shown) on which the micro-processor is mounted.

The criterion value may be a temperature value measured at a time point when an edge portion 420 of the second heat transfer member 400 is completely spaced apart from the edge portion of the battery module 10. For example, when the first heat transfer member 200 is formed of aluminum and the second heat transfer member 400 is formed of any one of zinc and magnesium, the criterion value may be about 32° C.

The control unit 600 may be formed as one or more microprocessors operated by a predetermined program. The predetermined program may include a series of commands to perform each operation constituting a method of controlling a cooling apparatus of a battery module according to an embodiment of the present invention, which will be described later.

Figure 5:
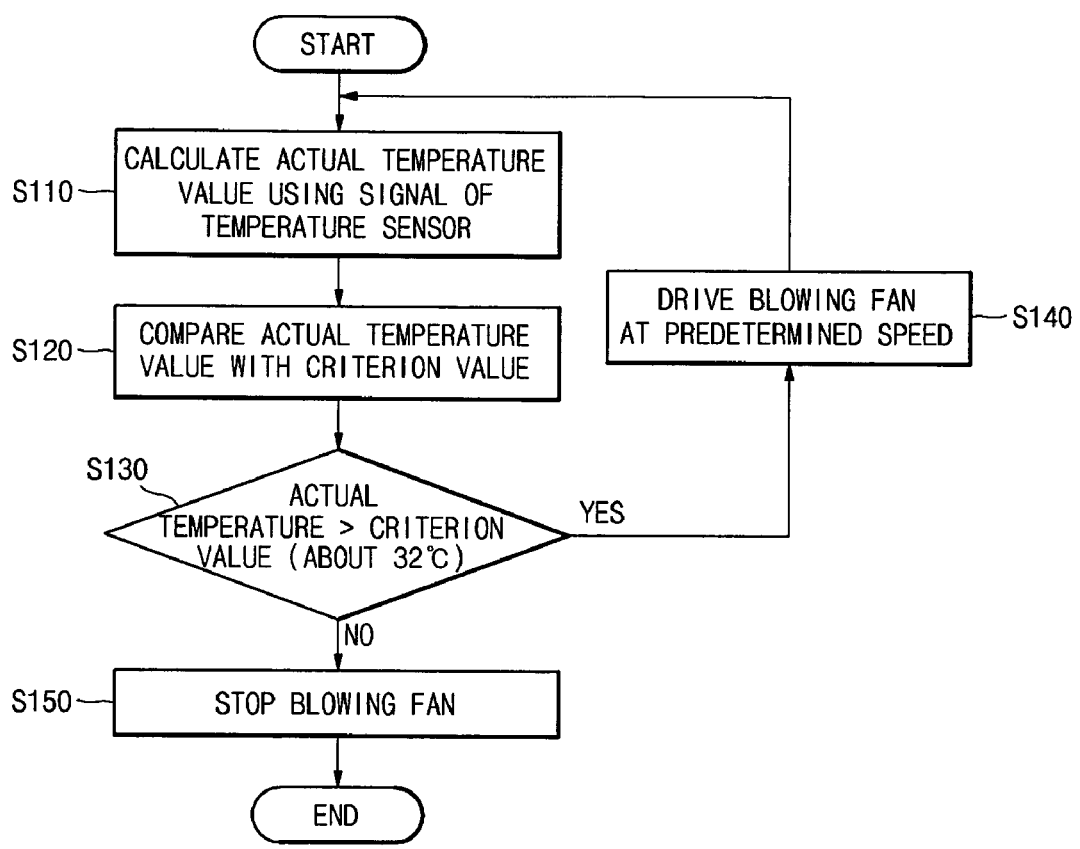
FIG. 5 illustrates a flowchart of a method of controlling a cooling apparatus of a battery module, according to an embodiment of the present invention.

Referring to FIGS. 3 through 5, a method of controlling a cooling apparatus of a battery module will now be described according to an embodiment of the present invention. FIG. 5 illustrates a flowchart of a method of controlling a cooling apparatus of a battery module, according to an embodiment.

First, in operation S110, a signal sensed by the temperature sensor 500 is transmitted to the calculation part 610, and an actual temperature value is calculated by the calculation part 610.

In operation S120, the actual temperature value calculated by the calculation part 610 is compared with a criterion value pre-stored at the comparison part 620 by the comparison part 620. The criterion value may be a temperature value measured at a time point when the edge portion 420 of the second heat transfer member 400 is completely spaced apart from the edge portion of the battery module 10, e.g., 32° C. Thus, heat may be emitted from the battery module 10 through the blowing fan 700 while maintaining the state where the battery module 10 has no temperature deviation, that is, a uniform temperature state in the battery module 10.

After the comparing is completed, in operation S130, it is determined whether the actual temperature value is greater than the criterion value.

In operation S140, when the actual temperature value is greater than the criterion value, a driving signal is applied through the output part 630 to the blowing fan 700 to drive the blowing fan 700 at a predetermined speed. At this point, the predetermined speed is variable according to a driving signal of the output part 630. That is, as the difference between the actual temperature value and the criterion value increases, the blowing fan 700 is accelerated through a logic of the output part 630 to increase the predetermined speed. In other words, when a difference value corresponding to the difference between an actual temperature value and the criterion value is compared with various reference values stored in the output part 630, and the difference value is disposed within a reference value range of any one of the various reference values, the blowing fan 700 may be accelerated to a predetermined speed matching with the reference value. Here the predetermined speed is predetermined through a test according to the reference value and may increases as the reference value increases.

In operation S150, when the actual temperature value is less than the criterion value, a stop signal is applied through the output part 630 to the blowing fan 700 to stop the driving of the blowing fan 700.

The above operations are repeated.

Hereinafter, a cooling apparatus of a battery module will now be described in detail with reference to FIGS. 6 and 7 according to another embodiment of the present invention.

Figure 6:
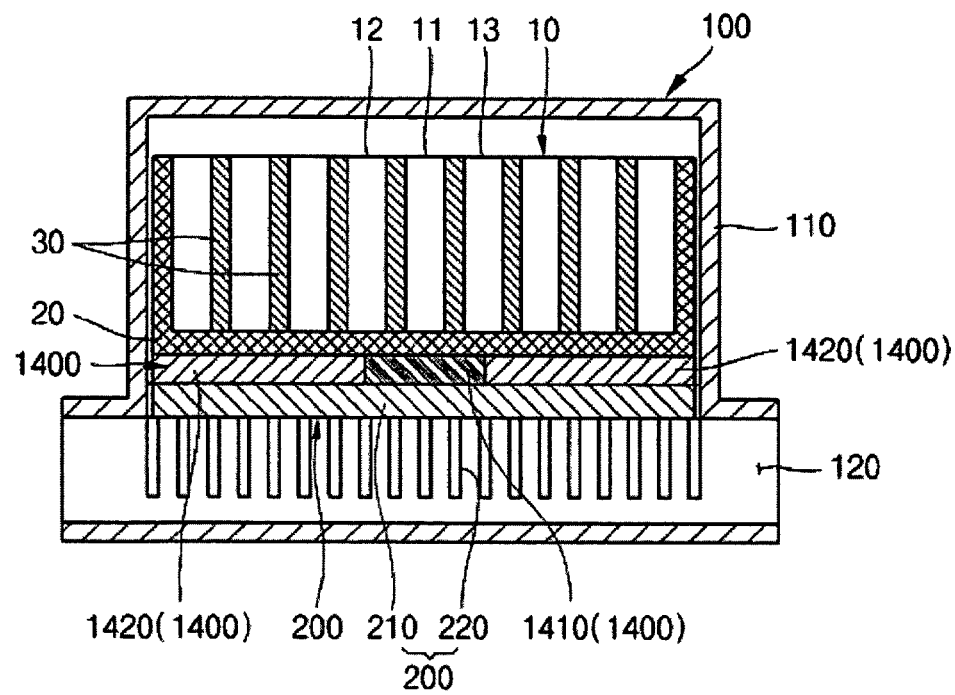
FIG. 6 illustrates a vertical cross-sectional view of a cooling apparatus of a battery module according to another embodiment of the present invention.

FIG. 6 illustrates a vertical cross-sectional view of a cooling apparatus of a battery module according to another embodiment of the present invention. FIG. 7 illustrates a vertical cross-sectional view of the state where only a first material contacts the center portion of the battery module after the first material is thermally expanded more than a second material in the state of FIG. 6.

Figure 7:
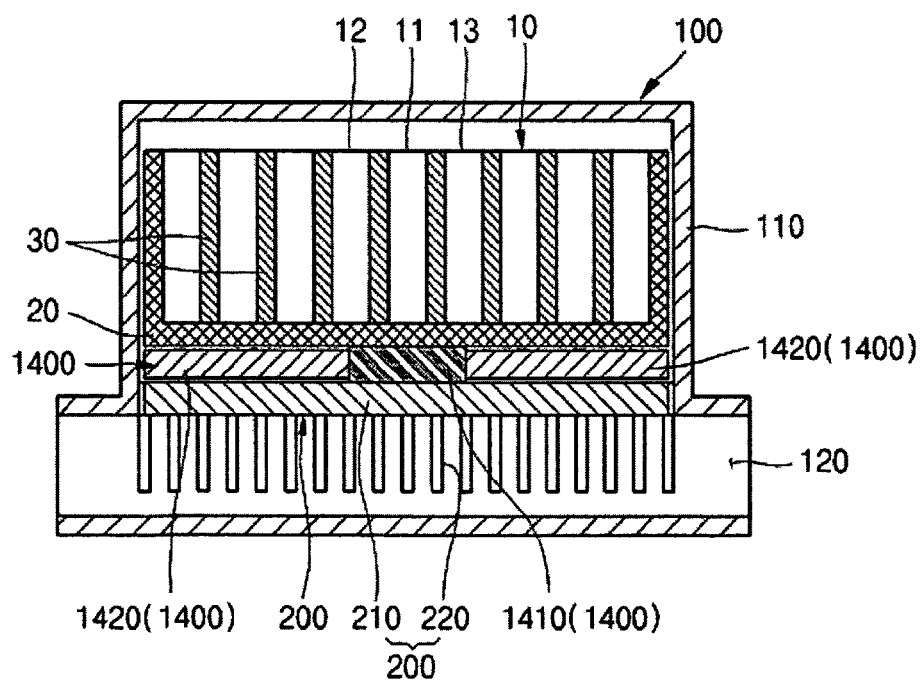
FIG. 7 illustrates a vertical cross-sectional view of the state where only a first material contacts the center portion of the battery module after the first material is thermally expanded more than a second material in the state of FIG. 6.

Referring to FIGS. 6 and 7, the cooling apparatus according to the current embodiment is the same as that of the previous embodiment except for a second heat transfer member 1400. Thus, the second heat transfer member 1400 will now be principally described. The second heat transfer member 1400 is disposed between the battery module 10 and the heat sink 200, and formed by combining at least two materials having different thermal expansion coefficients.

In detail, the two materials may include a first material 1410 disposed at the center portion of the battery module 10 and having a first thermal expansion coefficient, and second materials 1420 respectively disposed at the left and right edge portions of the battery module with respect to the center portion of the battery module and having a second thermal expansion coefficient less than the first thermal expansion coefficient. Specifically, since the secondary batteries are horizontally disposed in parallel in the battery module 10, the temperatures of the first, second and third secondary batteries 11, 12, and 13 disposed at a relatively center portion, i.e., the temperature of the center portion of the battery module 10 is higher than that of the edge part of the battery module 10. Ultimately, this temperature deviation may accelerate the degradation of the center portion of the battery module 10 to reduce the whole service life of the battery module 10 or degrade the whole performance of the battery module 10.

When the first material 1410 having a larger thermal expansion coefficient than that of the second material 1420 is disposed at the center portion of the battery module 10, when the temperature of the battery module 10 increases, only the center portion of the case 20 of the battery module 10 contacts the cooling plate 210 through the first material 1410, as illustrated in FIG. 7. That is, the center portion of the case 20 contacts the first material 1410 and, simultaneously, the first material 1410 contacts the cooling plate 210. Thus, heat is preferentially transferred from the center portion of the battery module 10 to the cooling plate 210 through the first material 1410. That is, the temperatures respectively of the secondary batteries constituting the battery module 10 may be maintained more uniformly to minimize the temperature deviation. Ultimately, since limitations due to the temperature deviation are reduced, the service life and performance of the battery module 10 can be improved.

For example, when the first heat transfer member 200 is formed of aluminum, the first material 1410 disposed at the center portion of the battery module 10 to contact the battery module 10 when the temperature of the battery module 10 varies, the first material 1410 may be formed of any one of zinc and magnesium, which have a larger thermal expansion coefficient than aluminum, and the second material 1420 may be formed of SUS (stainless steels prescribed in the Japanese Industrial Standard, and STS are stainless steels prescribed in the Korean Industrial Standard), which have a small thermal expansion coefficient.

Figure 8:
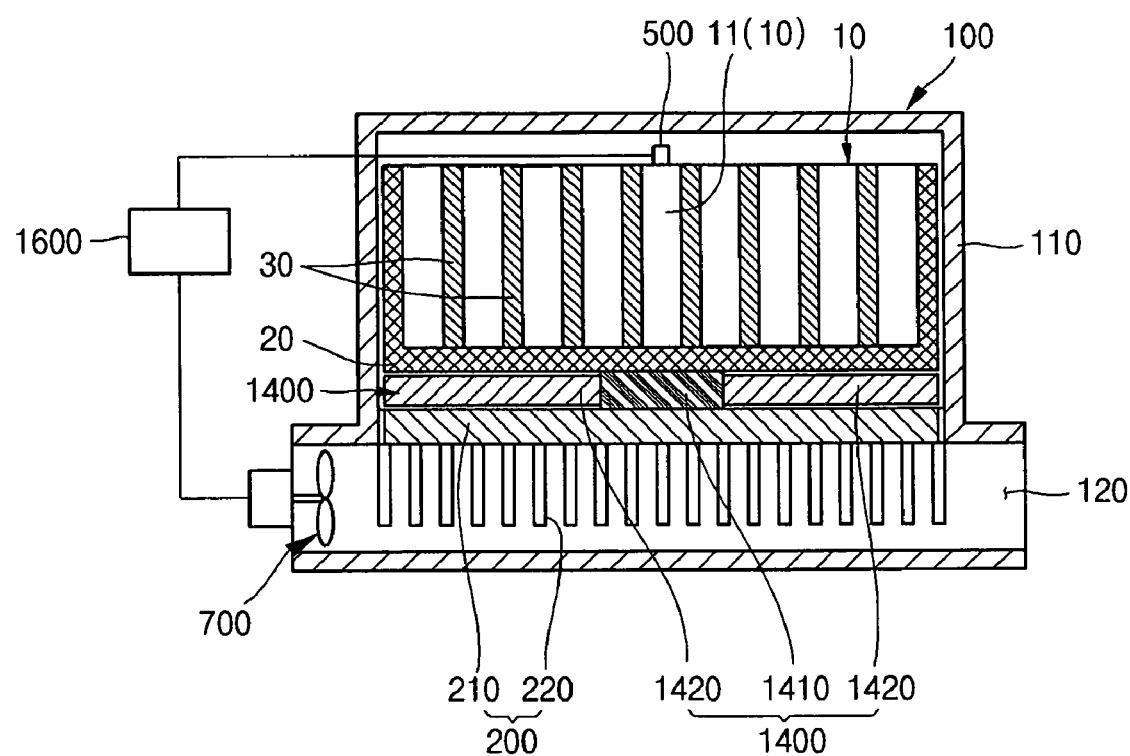
FIG. 8 illustrates a vertical cross-sectional view of the cooling apparatus of FIG. 6, which further includes a blowing fan, a temperature sensor, and a control unit.

Referring to FIG. 8, the cooling apparatus according to the current embodiment may further include the blowing fan 700, the sensing part 500, and a control unit 1600.

FIG. 8 is a vertical cross-sectional view illustrating the cooling apparatus according to the current embodiment, which further includes the blowing fan 700, the temperature sensor 500, and the control unit 1600.

Referring to FIG. 8, the cooling apparatus according to the current embodiment is the same as that of the previous embodiment except for the control unit 1600. Specifically, since the second heat transfer member 1400 is different from the second heat transfer member 400 of the previous embodiment illustrated in FIG. 3, a criterion value of the control unit 1600 may be different from that of the previous embodiment illustrated in FIG. 1.

That is, when the second heat transfer member 1400 includes the first material 1410 disposed at the center portion of the battery module 10 and the second materials 1420 disposed respectively at the left and right edge portions of the battery module 10 with respect to the center portion of the battery module 10, the criterion value may be a temperature value measured at the time point where the second material 1420 is completely spaced apart from the edge part of the battery module 10. For reference, when the first heat transfer member 200 is formed of aluminum, the first material 410 is formed of any one of zinc and magnesium, and the second material 420 is formed of SUS, the criterion value may be about 32° C.

A method of controlling the cooling apparatus according to the current embodiment is the same as that of the previous embodiment except for the criterion value because of the reason as described above. Since the criterion value is described just above, a description thereof will be omitted here.

Figure 9:
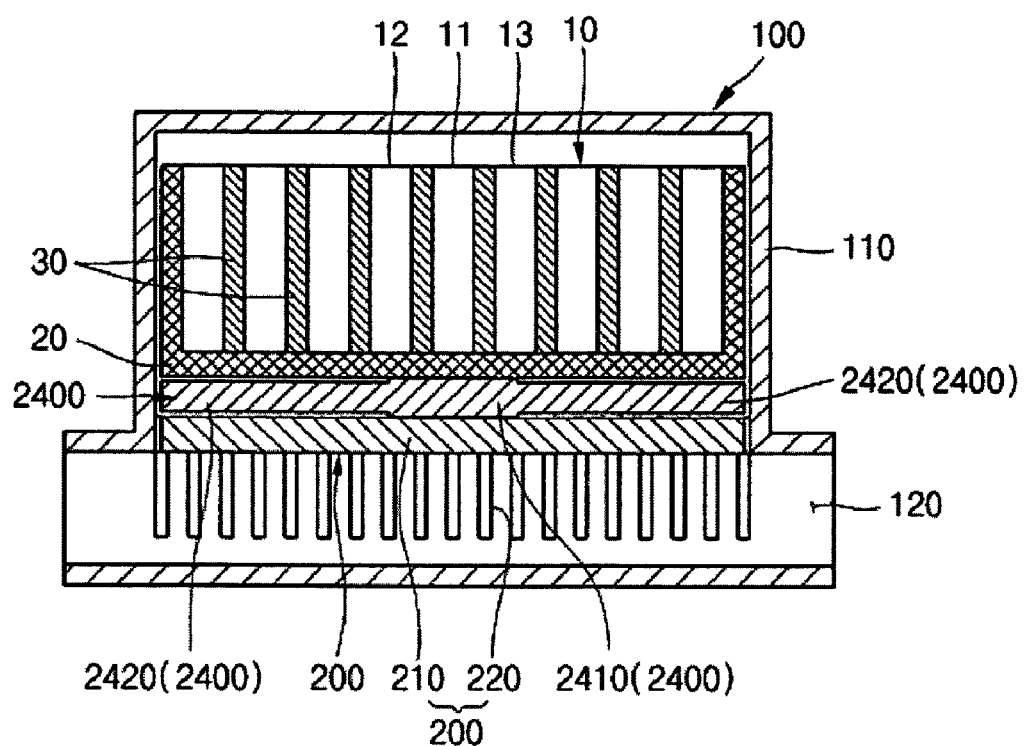
FIG. 9 illustrates a vertical cross-sectional view of a cooling apparatus of a battery module according to another embodiment of the present invention, in which only a first part of a second heat transfer member contacts the center portion of the battery module.

Hereinafter, a cooling apparatus of a battery module will now be described in detail with reference to FIG. 9 according to another embodiment of the present invention. FIG. 9 illustrates a vertical cross-sectional view of a cooling apparatus of a battery module according to another embodiment of the present invention, in which only a first part 2410 of a second heat transfer member 2400 contacts the center portion of the battery module 10.

Referring to FIG. 9, the cooling apparatus according to the current embodiment is the same as that of the previous embodiment except for the second heat transfer member 2400. Thus, the second heat transfer member 2400 will be principally described.

The second heat transfer member 2400 may include the first part 2410 disposed at the center portion of the battery module 10 and the second parts 2420 disposed at the left and right edge portions of the battery module 10 with respect to the center portion of the battery module 10. The first part 2410 is thicker than the second part 2420 such that the first part 2410 of the second heat transfer member 2400 contacts the center portion of the battery module 10 all the time.

Furthermore, the first part 2410 and the second parts 2420 may be formed of an identical material, and integrally formed.

Figure 10:
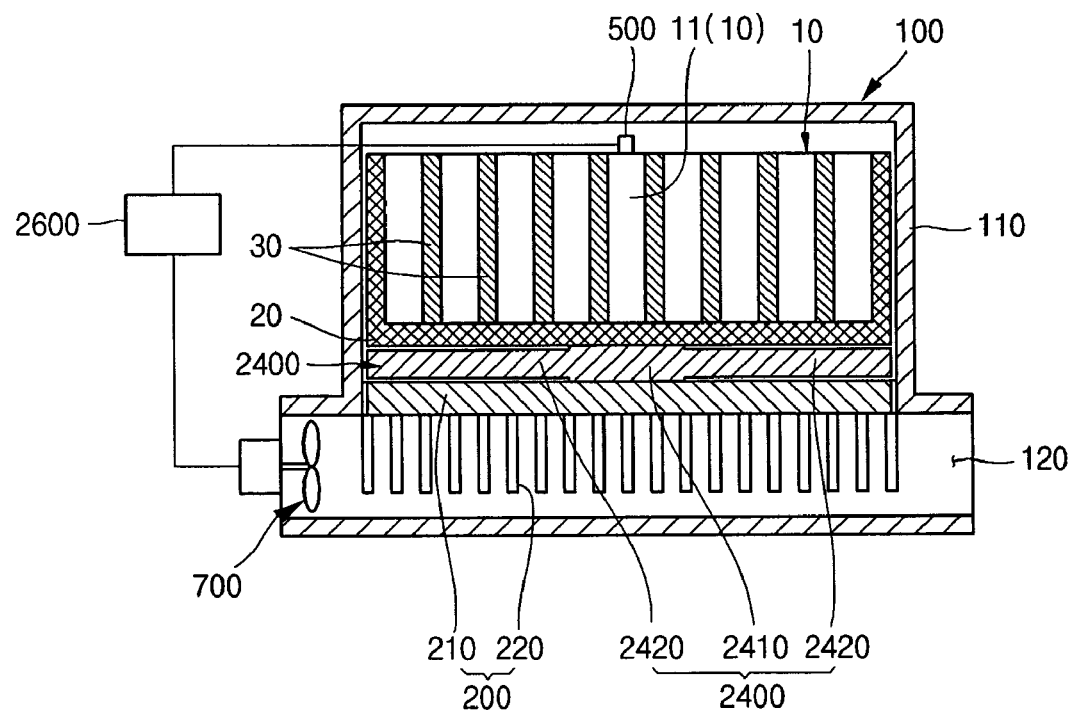
FIG. 10 illustrates a vertical cross-sectional view of the cooling apparatus of FIG. 9, which further includes a blowing fan, a temperature sensor, and a control unit.

Referring to FIG. 10, the cooling apparatus according to the current embodiment may further include the blowing fan 700, the sensing part 500, and a control unit 2600. FIG. 10 illustrates a vertical cross-sectional view of the cooling apparatus according to the current embodiment, which further includes the blowing fan 700, the temperature sensor 500, and the control unit 2600.

Referring to FIG. 10, the cooling apparatus according to the current embodiment is the same as that of the previous embodiment illustrated in FIG. 3 except for the control unit 2600. Specifically, since the second heat transfer member 2400 is different from the second heat transfer member 400 of the previous embodiment, a criterion value of the control unit 2400 is different from that of the previous embodiment.

That is, regardless of temperature variations of the battery module 10, the first part 2410 of the second heat transfer member 2400 contacts the center portion of the battery module 10 all the time, and the second parts 2420 of the second heat transfer member 2400 are spaced apart from the edge part of the battery module 10 all the time. Thus, in the current embodiment, it is difficult to determine the criterion value using a time point when the second parts 2420 of the second heat transfer member 2400 are spaced apart from the edge parts of the battery module 10. Thus, the criterion value may be predetermined to about 32° C. to minimize degradation of the battery module 10.

A method of controlling the cooling apparatus according to the current embodiment is the same as that of the previous embodiment illustrated in FIG. 3 except for the criterion value because of the reason as described above. Since the criterion value is described just above, a description thereof will be omitted here.

As described above, the cooling apparatus of the battery module and the method of controlling the cooling apparatus according to the embodiments of the present invention have following advantages.

According to embodiments, since the second heat transfer members 400, 1400, and 2400 contacting the portion having relatively high temperature in the battery module are provided, the temperature deviation between the secondary batteries constituting the battery module 10 can be minimized.

According to embodiments, since the blowing fan 700, the temperature sensor 500, and the control units 600, 1600, and 2600 are provided, heat can be dissipated more effectively from the battery module 10 with minimized temperature deviation.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. A cooling apparatus of a battery module, the cooling apparatus comprising:
   a housing including an accommodation part accommodating the battery module and an air passage through which external air passes, a plurality of battery cells being on a bottom surface of the battery module;
   a first heat transfer member fixed to the housing and having a first surface exposed to the air passage, a second surface of the first heat transfer member being opposite the first surface and parallel to the bottom surface of the battery module; and
   a second heat transfer member disposed between the battery module and the first heat transfer member, a first surface of the second heat transfer member overlapping and being parallel to each of the bottom surface of the battery module and the second surface of the first heat transfer member, a distance between the battery module and the first heat transfer member being normal to the first surface of the second heat transfer member wherein when a temperature of the battery module increases, the second heat transfer member contacts only a center portion of the bottom surface of the battery module, the center portion of the bottom surface of the battery module overlapping a predetermined number of battery cells positioned equidistantly with respect to two sidewalls of the battery module.

2. The cooling apparatus as claimed in claim 1, wherein:
   the second heat transfer member and the battery module are directly stacked on the first heat transfer member, and
   the second heat transfer member has a larger thermal expansion coefficient than that of the first heat transfer member.

3. The cooling apparatus as claimed in claim 1, wherein:
   each of the first and second heat transfer members completely overlaps the bottom surface of the battery module, and
   the first heat transfer member is formed of aluminum, and the second heat transfer member is formed of any one of zinc, magnesium, and stainless steel.

4. The cooling apparatus as claimed in claim 1, wherein the second heat transfer member includes at least two materials having different thermal expansion coefficients.

5. The cooling apparatus as claimed in claim 4, wherein the at least two materials comprise:
   a first material having a first thermal expansion coefficient and overlapping a center portion of the bottom surface of the battery module, the center portion of the bottom surface of the battery module overlapping a predetermined number of battery cells positioned equidistantly with respect to two sidewalls of the battery module; and
   a second material overlapping left and right edge portions of the bottom surface of the battery module with respect to the center portion of the battery module and having a second thermal expansion coefficient less than the first thermal expansion coefficient.

6. The cooling apparatus as claimed in claim 5, wherein the first heat transfer member is formed of aluminum,
   the first material of the second heat transfer member is any one of zinc and magnesium, and
   the second material of the second heat transfer member is stainless steel.

7. The cooling apparatus as claimed in claim 5, wherein the first thermal expansion coefficient is larger than that of the first heat transfer member.

8. The cooling apparatus as claimed in claim 5, further comprising:
a blowing fan configured to blow air to the air passage;
a temperature sensor configured to sense temperature of the center portion of the battery module; and
a control unit configured to control the blowing fan according to the temperature sensed by the temperature sensor,
wherein the control unit comprises:
a calculation part configured to calculate a signal sensed by the temperature sensor; and
a comparison part configured to compare a value calculated by the calculation part with a pre-stored criterion value; and
an output part configured to apply a corresponding speed value to the blowing fan, according to a signal of the comparison part; and
the criterion value is a temperature value measured at a time point when the second material is completely spaced apart from the edge portion of the battery module.

9. The cooling apparatus as claimed in claim 1, wherein the second heat transfer member comprises:
a first part disposed to overlap a center portion of the bottom surface of the battery module, the center portion of the bottom surface of the battery module overlapping a predetermined number of battery cells positioned equidistantly with respect to two sidewalls of the battery module; and
a second part disposed to overlap left and right edge portions of the bottom surface of the battery module with respect to the center portion of the battery module,
wherein the first part has a thickness larger than that of the second part.

10. The cooling apparatus as claimed in claim 9, wherein the first part is formed of a material that is identical to that of the second part.

11. The cooling apparatus as claimed in claim 9, wherein the first and second parts are integrally formed.

12. The cooling apparatus as claimed in claim 1, wherein the first heat transfer member comprises a heat sink, the heat sink comprising:
a cooling plate fixed to the housing and contacting the second heat transfer member, the cooling plate and second heat transfer member completely overlapping each other; and
a plurality of cooling fins protruding from the cooling plate into the air passage.

13. The cooling apparatus as claimed in claim 1, further comprising:
a blowing fan configured to blow air to the air passage;
a sensing part configured to sense temperature of a center portion of the battery module the center portion being equidistant with respect to sidewalls of the battery module; and
a control unit configured to control the blowing fan according to the temperature sensed by the sensing part.

14. The cooling apparatus as claimed in claim 13, wherein:
the sensing part includes a temperature sensor,
the battery module includes a plurality of secondary batteries,
the plurality of secondary batteries includes a first secondary battery disposed at the center portion of the battery module, and
the temperature sensor is directly connected to the first secondary battery.

15. The cooling apparatus as claimed in claim 13, wherein the control unit comprises:
a calculation part configured to calculate a signal sensed by the sensing part;
a comparison part configured to compare a value calculated by the calculation part with a pre-stored criterion value; and
an output part configured to apply a corresponding speed value to the blowing fan, according to a signal of the comparison part.

16. The cooling apparatus as claimed in claim 15, wherein the output part accelerates the blowing fan as a difference between the calculated value and the criterion value increases.

17. The cooling apparatus as claimed in claim 13, wherein the control unit is included in a battery management system electrically connected to the battery module.

18. The cooling apparatus as claimed in claim 13, wherein the control unit is configured to keep the fan blowing as long as the temperature sensed by the temperature sensor is greater than a criterion value, the criterion value being a temperature value when an edge portion of the second heat transfer member is completely spaced apart from an edge portion of the battery module.

19. The cooling apparatus as claimed in claim 1, further comprising:
a blowing fan configured to blow air to the air passage;
a temperature sensor configured to sense temperature of a center portion of the battery module, the center portion being equidistant with respect to sidewalls of the battery module; and
a control unit controlling the blowing fan according to the temperature sensed by temperature sensor,
wherein the control unit comprises:
a calculation part calculating a signal sensed by the temperature sensor; and
a comparison part comparing a value calculated by the calculation part with a pre-stored criterion value; and
an output part applying a corresponding speed value to the blowing fan, according to a signal of the comparison part, and
the criterion value is a temperature value when an edge portion of the second heat transfer member is completely spaced apart from an edge portion of the battery module.

* * * * *